R. E. CLARK.
OPERATING DEVICE FOR VALVE GRINDERS.
APPLICATION FILED NOV. 26, 1920.
1,401,314. Patented Dec. 27, 1921.
2 SHEETS—SHEET 1.
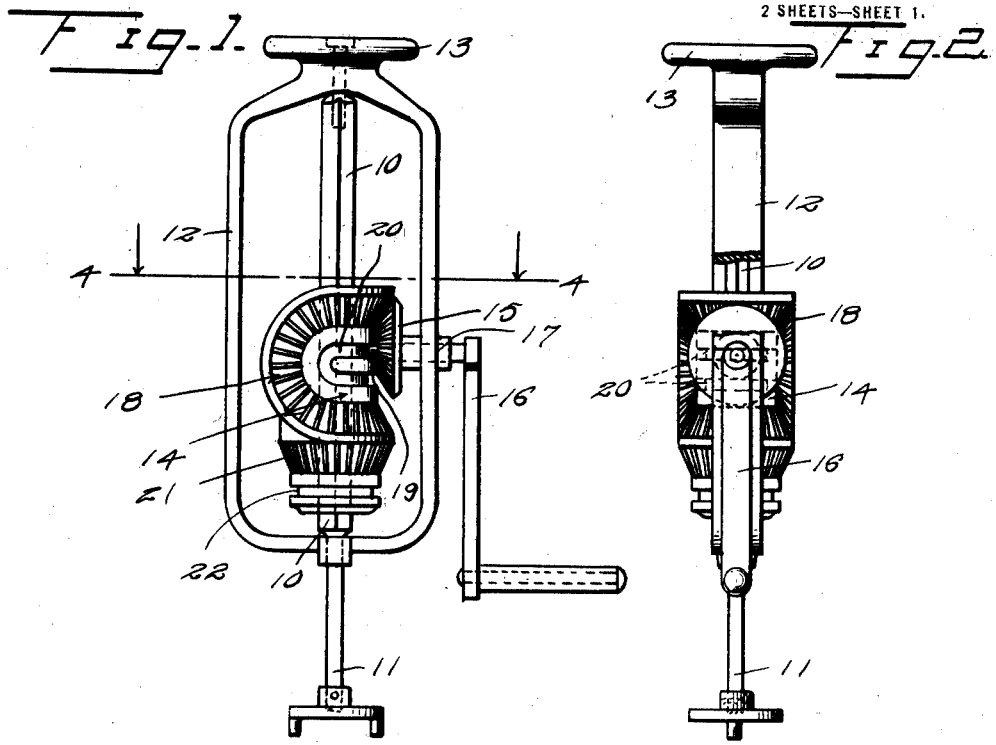
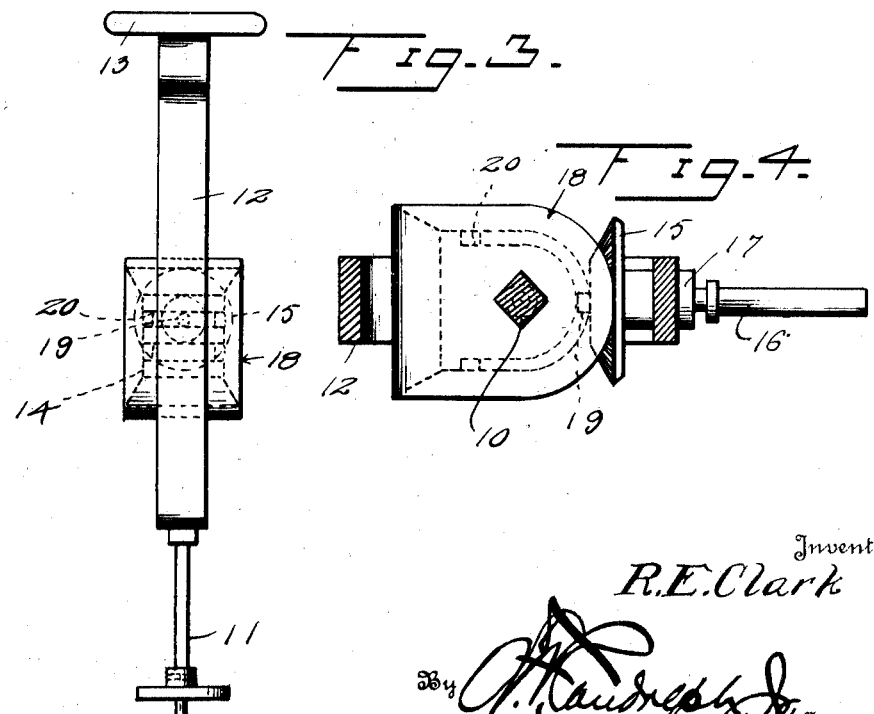
Inventor
R. E. Clark

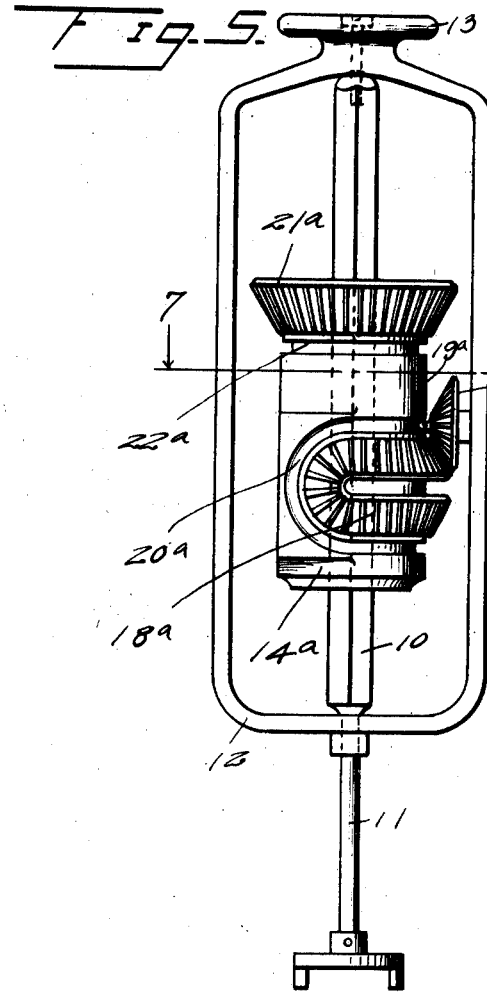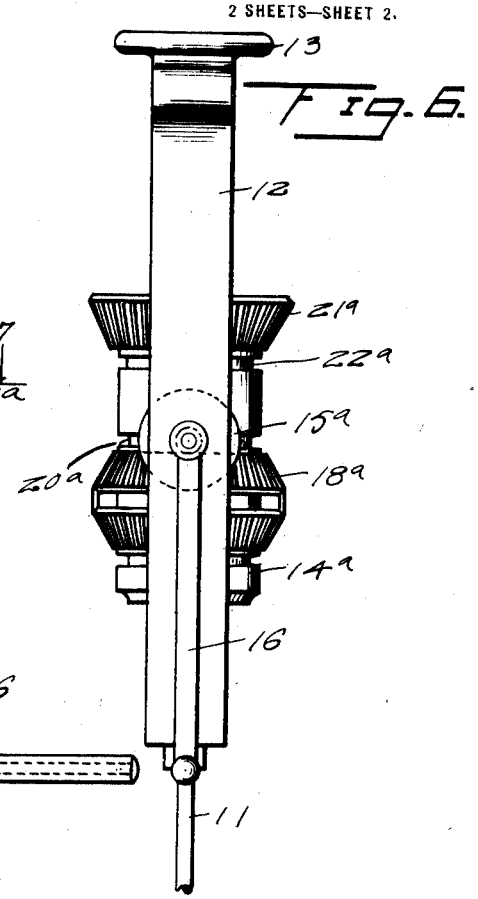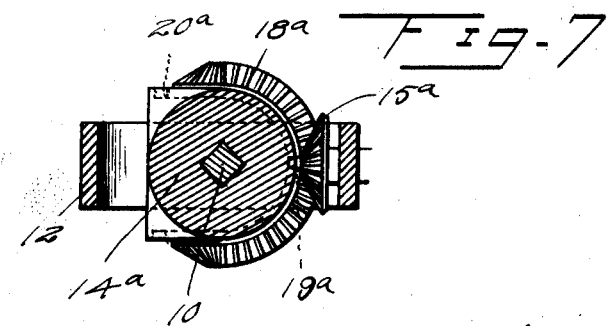

UNITED STATES PATENT OFFICE.

ROY E. CLARK, OF EARLHAM, IOWA.

OPERATING DEVICE FOR VALVE-GRINDERS.

1,401,314. Specification of Letters Patent. Patented Dec. 27, 1921.

Application filed November 26, 1920. Serial No. 426,442.

*To all whom it may concern:*

Be it known that I, ROY E. CLARK, a citizen of the United States, residing at Earlham, in the county of Madison and State of Iowa, have invented certain new and useful Improvements in an Operating Device for Valve-Grinders; and I do hereby declare the following to be a full, clear, and exact description of the invention, such as will enable others skilled in the art to which it appertains to make and use the same.

The object of the invention is to provide a simple, inexpensive, and efficient form of operating device for valve grinders whereby an oscillatory or rotary movement alternately in opposite directions may be imparted to the chuck spindle of the tool from a continuously and uniformly operated rotary driving member actuable, for example, by a hand crank, under conditions insuring a uniform grinding of a valve seat; and with this object in view, the invention consists in a construction and combination of parts of which a preferred embodiment is shown in the drawings, wherein:

Figure 1 is a side view of the tool,

Fig. 2 is a front view thereof,

Fig. 3 is a rear view,

Fig. 4 is a transverse section on the plane indicated by the line 4—4 of Fig. 1.

Figs. 5 and 6 are respectively side and front views of a modified form of the tool in the matter of the arrangement of the rack which is exteriorly instead of interiorly toothed as in the form shown in Figs. 1 and 2.

Fig. 7 is a sectional view of the same.

The apparatus consists essentially of a chuck spindle 10 adapted to carry a chuck 11 for engagement with a suitable tool and mounted in a frame 12 having at its upper end a grip 13 by which the necessary pressure may be applied to insure the proper operation of the grinding tool, together with a head 14 keyed to the chuck spindle for reciprocatory movement thereon and operating means for the head consisting of a driving pinion 15 with which is connected a crank 16 mounted in a suitable bearing 17 in said frame.

In the construction illustrated the body portion of the chuck spindle within the frame is cross sectionally square to provide for sliding movement of the head 14 thereon while insuring the transmission of rotary motion from the head to the spindle to cause the desired rocking or oscillatory movement of said spindle, and carried by the head is an endless, elongated, parallel sided rack 18, toothed to agree with the driving pinion 15 which is in mesh therewith, and disposed longitudinally in concentric relation with the spindle, so that as the driving pinion is rotated, a progressive movement of the rack is produced to communicate rotary motion to the spindle. In order to maintain a proper relation between the pinion and the rack and cause the necessary reciprocatory movement of the head to insure the travel of the pinion around the looped ends of the rack so as to pass from one side of the rack to the other, a guiding means is employed consisting, in the construction illustrated of an axial pin 19 on the pinion operating in an elongated channel 20 on the head arranged parallel with said rack. As the pinion is rotated continuously in one direction, the teeth thereof cause a longitudinal progressive movement of the rack as above indicated and at the looped end portions thereof cause a reciprocatory movement of the head on the spindle to which it is keyed, so that in operation a rocking or oscillatory movement is communicated to the spindle to correspondingly actuate the chuck.

By reason of the movement indicated, a uniform grinding of a valve and seat may be effected.

As shown in the drawing the spindle is preferably of cross sectionally square or angular form as a means of keying the head thereto for the purpose of affording a free longitudinal movement of the head thereon while causing the head to communicate rotary movement to the spindle, but it will be understood that any other equivalent means of keying the head to the spindle may be employed.

Also in order to provide for a continuous rotary movement of the chuck spindle and tool, without imparting a reciprocatory movement thereto, the head is provided with a toothed gear 21 adapted to mesh with the driving pinion 15, an annular guide channel 22 being provided parallel therewith and beneath the same for the reception of the axial guide pin 19. Said gear may be disposed in operative relation with the drive pinion by a longitudinal shifting movement of the head upon the spindle 10. Such shifting is possible in view of the fact that the gear 15 is detachably connected to crank 16 and can be removed to dispose pin 19 in either slot 20 or 22 and the gear 15 thereafter operatively engaged by the crank.

Also as indicated in Figs. 5, 6 and 7 the rack 18ª is susceptible of modification to dispose the teeth exteriorly thereof instead of interiorly as shown at 18 in the form illustrated in Figs. 1 to 4 inclusive, and in this event the guide channel 20ª is arranged exteriorly of the rack instead of within the same for the reception of the guide pin 19ª disposed axially of the drive pinion 15ª which otherwise is constructed and operated as hereinbefore indicated. Also in connection with this modified arrangement the head 14ª is provided with the beveled gear 21ª adjacent to which is located the guide channel 22ª for use when a continuous rotary instead of a combined rotary and reciprocatory movement of the head is required.

Thus by the arrangement disclosed the grinding tool or bit, or the valve positioned upon its seat may receive either an oscillatory movement, or in other words a rotary movement alternately in opposite directions, or a continuous rotary movement, at the option of the operator and merely by a relative rearrangement of the operating means, inasmuch as the operating pinion or drive pinion is adapted for selective engagement either with the endless rack or the gear, after the interlocking guiding means represented by the guide pin and channel serves in either adjustment or arrangement to maintain the drive pinion in proper relation with the teeth of the complementary member carried by the rotary head.

Having thus described the invention, what I claim is:—

1. A valve grinding tool having a frame, a chuck spindle revolubly mounted in the frame, a head keyed to the spindle and provided with a plurality of gear members, a driving pinion mounted upon the frame for selective engagement with said gear members, and complemental interlocking guiding means carried by the drive pinion and the head respectively adjacent to the gear members of the latter.

2. A valve grinding tool having a frame, a chuck spindle revolubly mounted in the frame, a head keyed to the spindle and provided with a plurality of gear members, a driving pinion mounted upon the frame for selective engagement with said gear members, and complemental interlocking guiding means carried by the drive pinion and the head respectively adjacent to the gear members of the latter, and consisting of an axial guide pin on the former and guide channels on the head.

3. A valve grinding tool having a frame, a chuck spindle revolubly mounted in the frame, a head keyed to the spindle and provided with an endless, elongated, parallel sided rack disposed longitudinally in concentric relation with the spindle, and also provided with a gear member having an annular series of teeth, a drive pinion mounted upon the frame for meshing relation selectively with said rack and gear member, and complemental guiding elements carried respectively by the drive pinion and head adjacent to said rack and gear member.

4. A valve grinding tool having a frame, a chuck spindle revolubly mounted in the frame, a head keyed to the spindle and provided with an endless, elongated, parallel sided rack disposed longitudinally in concentric relation with the spindle, and also provided with a gear member having an annular series of teeth, a drive pinion mounted upon the frame for meshing relation selectively with said rack and gear member, and complemental guiding elements carried respectively by the drive pinion and head adjacent to said rack and gear member, said means consisting of a guide pin disposed axially of the drive pinion, and guide channels arranged parallel respectively with said rack and gear.

In testimony whereof I affix my signature in presence of two witnesses.

ROY E. CLARK.

Witnesses:
G. H. MURPHY,
L. A. WISE.